United States Patent [19]

Gadkaree

[11] Patent Number: 5,658,372

[45] Date of Patent: Aug. 19, 1997

[54] SYSTEM AND METHOD FOR ADSORBING CONTAMINANTS AND REGENERATING THE ADSORBER

[75] Inventor: Kishor P. Gadkaree, Big Flats, N.Y.

[73] Assignee: Corning Incorporated, Corning, N.Y.

[21] Appl. No.: 500,078

[22] Filed: Jul. 10, 1995

[51] Int. Cl.⁶ .................................................. B01D 53/04
[52] U.S. Cl. ......................... 95/116; 95/127; 95/139; 95/144; 95/145; 95/148
[58] Field of Search .................. 95/143–148, 139, 95/127, 116; 96/130–133, 144; 55/523, 524, DIG. 30

[56] References Cited

U.S. PATENT DOCUMENTS

| | | | |
|---|---|---|---|
| 2,614,657 | 10/1952 | Nicholson et al. | 95/143 X |
| 2,632,726 | 3/1953 | Ringham et al. | 95/143 X |
| 2,636,574 | 4/1953 | Widdowson et al. | 95/143 X |
| 2,899,474 | 8/1959 | Ricards | 95/143 X |
| 2,978,407 | 4/1961 | Tuttle et al. | 95/143 X |
| 2,987,471 | 6/1961 | Eggertsen | 95/143 X |
| 3,109,722 | 11/1963 | Dow | 95/143 X |
| 3,237,379 | 3/1966 | Kant et al. | 95/143 X |
| 3,252,268 | 5/1966 | Stark | 95/143 X |
| 3,844,739 | 10/1974 | Alfrey, Jr. | 95/146 |
| 4,399,052 | 8/1983 | Sugino | 252/421 |
| 4,518,704 | 5/1985 | Okabayashi et al. | 502/80 |
| 4,758,272 | 7/1988 | Pierotti et al. | 75/246 |
| 4,790,859 | 12/1988 | Marumo et al. | 95/143 X |
| 4,992,233 | 2/1991 | Swaroop et al. | 419/2 |
| 5,118,329 | 6/1992 | Kosaka et al. | 95/146 X |
| 5,238,470 | 8/1993 | Tolles et al. | 95/146 X |
| 5,250,491 | 10/1993 | Yan | 95/146 X |
| 5,308,457 | 5/1994 | Dalla Betta et al. | 95/143 |
| 5,395,428 | 3/1995 | von Blücher et al. | 95/146 X |

FOREIGN PATENT DOCUMENTS

| | | |
|---|---|---|
| 488716 | 6/1992 | European Pat. Off. . |
| 608539 | 8/1994 | European Pat. Off. . |

Primary Examiner—Robert Spitzer
Attorney, Agent, or Firm—L. Rita Quatrini

[57] ABSTRACT

A system for adsorbing a plurality of contaminants from a workstream composed of a first stage open-ended activated carbon monolith adsorber, a second stage open ended activated carbon monolith adsorber downstream of the first stage. The first stage activated carbon has an average pore size that is larger than the average pore size of the second stage activated carbon. A method for removing more than one contaminant from a workstream which involves passing a workstream containing more than one contaminant through a first open ended activated carbon monolith adsorber having a pore size suitable for adsorbing the major portion of the larger size contaminant and for allowing the smaller size contaminant to pass through the monolith, to cause adsorption of the major portion of the larger size contaminant by the activated carbon, while allowing the smaller size contaminant to pass through the first monolith, and thereafter passing the effluent from the first adsorber through a second open ended activated carbon monolith adsorber having a pore size suitable for adsorbing the smaller size contaminant to cause adsorption of the major portion of the smaller size contaminant by the second monolith activated carbon. The adsorbed contaminants can then be desorbed by passing a regenerating stream(s) through the respective monoliths.

6 Claims, 1 Drawing Sheet

SYSTEM AND METHOD FOR ADSORBING CONTAMINANTS AND REGENERATING THE ADSORBER

This invention relates to a system and method of adsorbing more than one contaminant from a workstream, by selectively adsorbing the contaminants on activated carbon based on the molecular size of the contaminants. The system is regenerated by then passing a regenerating stream(s) through the adsorbers.

BACKGROUND OF THE INVENTION

Activated carbon is commonly used in many purification systems. Activated carbon derived from carbon precursors is especially useful as an adsorbent because of its continuous uninterrupted structure of random three dimensional graphitic platelets. The platelets have angstrom sized porosity between them, into which contaminants are adsorbed.

In industrial exhaust gases there is typically a mixture of gases that has to be adsorbed from a workstream. An automotive exhaust system, for example contains more than twenty-five different organics. The kinetic molecular diameters of these organics can range from 3–10 angstroms. For such a workstream, one particular carbon structure with a given mean platelet distance may not be the most desirable adsorber. This adsorber would adsorb the large organics much more strongly than the smaller organics, the latter passing through the system unadsorbed.

Furthermore, during desorption it is much easier to remove small organics than large organics. One solution to this problem is to heat the activated carbon adsorber to a higher temperature to remove the large organics. However, this requires a significant energy input.

The present invention relates to a system and method for efficiently removing multiple contaminants from a workstream using more than one activated carbon adsorber with varying pore sixes in the activated carbon, and for efficiently desorbing the contaminants and regenerating the activated carbon for re-use. The adsorption efficiency of the activated carbon is maintained over repeated adsorption-desorption cycles.

SUMMARY OF THE INVENTION

In accordance with one aspect of the invention there is provided a system for adsorbing a plurality of contaminants from a workstream composed of a first stage open-ended activated carbon monolith adsorber, a second stage open ended activated carbon monolith adsorber downstream of the first stage. The first stage activated carbon has an average pore size that is larger than the average pore size of the second stage activated carbon.

In accordance with another aspect of the invention, there is provided a method for removing more than one contaminant from a workstream which involves passing a workstream containing more than one contaminant through a first open ended activated carbon monolith adsorber having a pore size suitable for adsorbing the major portion of the larger size contaminant and for allowing the smaller size contaminant to pass through the monolith, to cause adsorption of the major portion of the larger size contaminant by the activated carbon, while allowing the smaller size contaminant to pass through the first monolith, and thereafter passing the effluent from the first adsorber through a second open ended activated carbon monolith adsorber having a pore size suitable for adsorbing the smaller size contaminant to cause adsorption of the major portion of the smaller size contaminant by the second monolith activated carbon. The adsorbed contaminants can then be desorbed by passing a regenerating stream(s) through the respective monoliths.

DETAILED DESCRIPTION OF THE INVENTION

Figure 1:
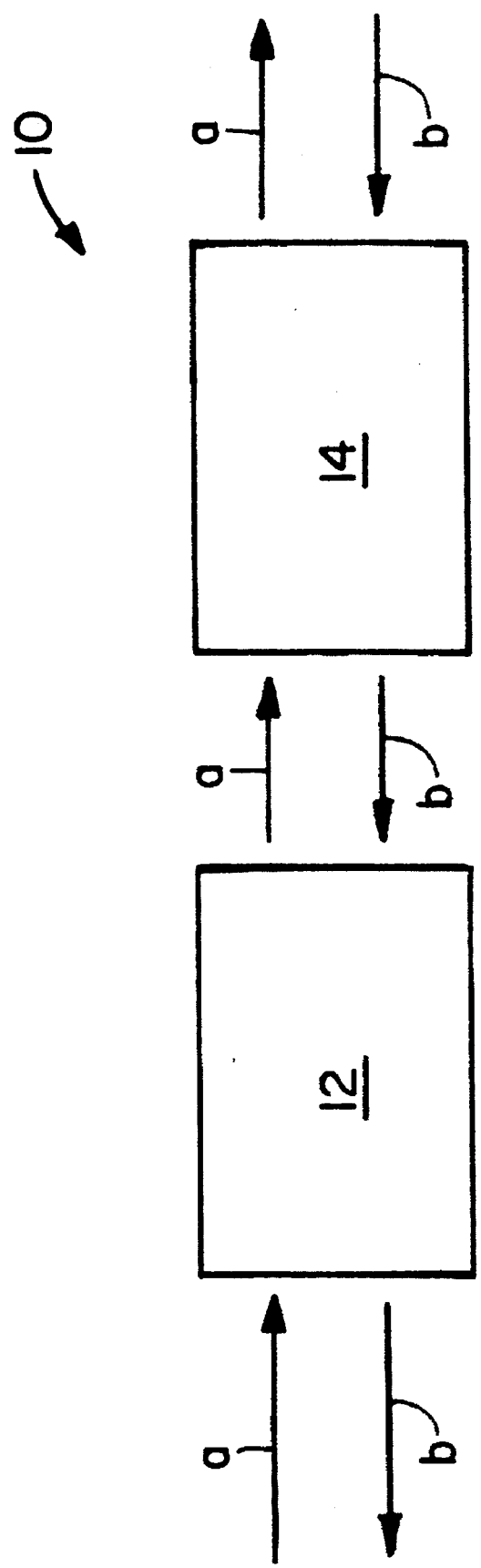
FIG. 1 is a schematic diagram of a system of the present invention showing large pore adsorber monolith upstream of a small pore adsorber monolith and the direction of flow of contaminant-carrying workstreams and direction of flow of a regenerating stream.

The present invention provides a system and method for removing more than 1 contaminant from a fluid workstream by selective adsorption of the contaminants on activated carbon monolithic adsorbent structures. By providing the activated carbon in pore sizes, as measured in terms of mean platelet distance, suitable to hold the respective contaminants, the contaminants can be partitioned among the various sized activated carbon adsorbents. The workstream is passed first through the adsorber having the larger pore size to adsorb the major portion of the corresponding large molecular size contaminant, thus allowing the smaller molecular size contaminant(s) to pass through. The workstream then passes through the adsorbent having the smaller pore size to adsorb the major portion of the corresponding small size contaminant. By major portion is meant greater than about 50% by weight of the respective pore size contaminants.

The adsorbed contaminants can then be desorbed by passing a suitable regenerating fluid stream(s), e.g. hot air, nitrogen, etc. through the respective monoliths. This can be done in several ways. For example, the most useful method for the purposes of the invention to desorb the contaminants in the reverse order or countercurrent to which they adsorbed. This is done by first passing a regenerating stream through the small pore adsorber to strip the small pore contaminants therefrom. Thereafter the regenerating stream is passed through the large pore adsorber to strip the large pore contaminants therefrom. The resulting regenerated system is ready to be re-used in another adsorption-desorption cycle. Another desorption method is to pass a separate regenerating stream (co-current) through each monolith and thus obtain separate fractions of the large and small size contaminants.

FIG. 1 is a schematic diagram of a system (10) of the present invention showing large pore adsorber monolith (12) upstream of a small pore adsorber monolith (14), and the direction of flow of contaminant-carrying workstream (a) and direction of flow of a regenerating stream (b) which is shown in a countercurrent mode.

According to this invention, by large pore size is meant a mean platelet distance of about 10 to 30 angstroms; and small pore size is meant a mean platelet distance of about 5 to 15 angstroms. These are relative sizes and it can be seen that there is overlap between the two size ranges.

According to the present invention, large size contaminants are those the molecules of which correspond to the large pore size activated carbon, while the small size contaminants are those the molecules of which correspond to the small pore size activated carbon. Some examples of what are considered to be large size contaminants, although it is to be understood that the invention is not limited to these species are butane, toluene, xylene, isopropanol, pentane, hexane, etc., and combinations of these and others. Some examples of what are to be considered small pore size contaminants, although it is to be understood that the invention is not limited to these, are methane, formaldehyde, carbon dioxide, hydrogen, ethylene, butane, etc., and combinations of these and others. Butane among others can be considered to be within both the large and small size classification for the purpose of the invention.

In one embodiment, in automotive exhaust purification, the system utilizes two adsorbers preferably as honeycombs wherein the activated carbon has significantly different mean platelet differences in the two. The first adsorber into which the automotive exhaust flows has a mean platelet distance of about 10–30 angstroms. This adsorber will adsorb the largest of the organics in the automotive exhaust stream. Preferably the mean platelet distance is about 20–25 angstroms. Most of the large organics will be adsorbed by this adsorber. The second adsorber in series with the first adsorber has a mean platelet distance in the activated carbon of about 5–15 angstroms. The preferred platelet distance is about 5–10 angstroms. This adsorber adsorbs the small organics which were not adsorbed by the first adsorber, since their adsorption potential is much smaller than the large organics due to the ratio of molecular size to the platelet distance. The adsorption potential for the smaller organics is high when passing over the second adsorber due to the favorable ratio of molecular size to platelet distance. The adsorption potential, of course, also depends on the temperature of adsorption relative to the vapor pressure of the organic.

The above described two adsorbers will have molecules adsorbed thereon with significantly lower maximum difference in adsorption potential than in the case of one adsorber system, where generally larger organics have a higher adsorption potential and smaller adsorbers have a lower adsorption potential.

The desorption of the above-described system can be carried out by flowing hot air, preferably generated by electrical heating, in the opposite direction in such a way that it flows over the adsorber trapping the small organics first and then over the adsorber trapping the large organics. Since adsorption forces for the organics are similar on both adsorbers, desorption can be carried out a lower temperature than with a one adsorber system.

In another embodiment, the adsorption efficiency of such a system can also be enhanced over a system where only one platelet size carbon is used. In the one platelet system, large organics with higher adsorption potential occupy the sites easily and smaller organics escape without adsorption. Such a system is useful in separations applications.

The adsorbers can be in the form of an activated carbon coating on a substrate, or they can be structures made entirely of activated carbon.

For the activated carbon coated adsorbers, the coating is preferably a continuous uninterrupted activated carbon impregnated into the pores of the substrate. The coating can also be distributed over the outer surface of the substrate.

The adsorber can be in the form of a body shaped out of activated carbon.

The adsorbers can have electrically conducting means for conducting an electric current therethrough.

Substrate materials include both electrically non-conducting and electrically conducting materials. Some especially suited substrate materials are ceramic, glass ceramic, glass, metal, and combinations thereof. By combinations is meant physical or chemical combinations, eg., mixtures, compounds, or composites. Molecular sieves, e.g. zeolites are also suitable substrate materials.

Some materials that are especially suited to the practice of the present invention, although it is to be understood that the invention is not limited to such, are those made of cordierite, mullite, clay, talc, zircon, zirconia, zirconates, zirconia-spinel, zeolites, magnesium alumino-silicates, spinel, alumina, silica, silicates, borides, alumino-silicates, eg., porcelains, lithium aluminosilicates, alumina silica, feldspar, titania, fused silica, nitrides, borides, carbides, eg., silicon carbide, silicon nitride, or mixtures of these. Especially useful materials are cordierite and/or mullite. Cordierite is preferred because its coefficient of thermal expansion is comparable to that of carbon, increasing the stability of the activated carbon body.

The invention is suitable for use with metal substrates. These substrates can be made of any sinterable metal or metal composition. Especially suited are iron group metal, chromium, and aluminum compositions, with the preferred iron group metal being iron. Especially preferred is Fe, Al, and Cr. For example, Fe5-20Al5-40Cr, and Fe7-10Al10-20Cr powders with other possible additions are especially suited. Some typical compositions of metal powders are disclosed in U.S. Pat. Nos. 4,992,233, 4,758,272, and European patent application publication no. 488716, which are herein incorporated by reference as filed. U.S. Pat. No. 4,992,233 relates to methods of producing porous sintered bodies made from metal powder compositions of Fe and Al with optional additions of Sn, Cu, and Cr. European patent application publication no. 488716 relates to porous sintered bodies having a composition consisting essentially of in percent by weight about 5 to about 40 chromium, about 2 to about 30 aluminum, 0 to about 5 of special metal, 0 to about 4 of rare earth oxide additive and the balance being iron group metal, and unavoidable impurities such as eg., Mn or Mo, with the preferred iron group metal being iron. When rare earth oxide is present, the special metal is at least one of Y, lanthanides, Zr, Hf, Ti, Si, alkaline earth metal, B, Cu, and Sn. When no rare earth oxide is present, the special metal is at least one of Y, lanthanides, Zr, Hf, Ti, Si, and B, with optional additions of alkaline earths, Cu, and Sn.

The substrate is preferably in the shape of a honeycomb having a matrix of thin porous walls which form a multiplicity of cells or channels extending between the ends of the honeycomb. Some examples of honeycombs produced by the process of the present invention, although it is to be understood that the invention is not limited to these, are those having about 172 cells/cm$^2$ (1100 cells/in$^2$), about 94 cells/cm$^2$ (600 cells/in$^2$), about 62 cells/cm$^2$ (400 cells/in$^2$), or about 47 cells/cm$^2$ (300 cells/in$^2$), those having about 31 cells/cm$^2$ (200 cells/in$^2$), or about 15 cells/cm$^2$ (100 cells/in$^2$), or about 2.5 cells/cm$^2$, (16 cells/in$^2$) or about 1.5 cells/cm$^2$ (9 cells/in$^2$).

Wall (web) thicknesses range typically from about 0.1 to about 1.3 mm (about 4 to about 50 mils) for most applications and it is to be understood that the invention is not limited to these dimensions. The external size and shape of the body is controlled by the application and is not limited to those described above. For example, other combinations of cell densities and wall thicknesses can be made.

The substrate can be fabricated in a number of ways. For example, a ceramic honeycomb with straight channels or cells is manufactured according to methods well known in the art.

One method is to shape a mixture of raw materials such as by extrusion followed by heat-treating. The wall porosity of the honeycomb is controlled by the raw materials used during the manufacture and the process conditions during fabrication. A burnout agent such as graphite, carbon powder, wood fibers, cellulose, etc. are typically used during extrusion which burns off during subsequent high temperature processing, leaving pores of the size determined by the size of the burnout agent particulates. Porosity can also be controlled by choosing appropriate raw materials which form porosity during sintering. Such a honeycomb is then impregnated with a carbon precursor material which is subsequently cured, carbonized, and the carbon activated.

By carbon precursor is meant a carbon-containing substance that converts to continuous structure carbon on heating. For purposes of this invention, a carbon precursor is in the form of a solution or low viscosity liquid at ambient temperatures or capable of being liquified by heating or other means, and suitable for penetrating through to the porosity of the substrate filter.

A carbon precursor is preferred over activated carbon particle coating because as a result of curing, carbonizing and activating, the carbon atoms are arranged in a continuous uninterrupted structure of random three dimensional graphitic platelets. The platelets have angstrom sized pores typically about 5 to about 50 angstroms for adsorption as distinguished from micron-size pores. Pores in several hundred micron size range can be present in the activated carbon, but they do not contribute to adsorption capacity. Upon curing and carbonizing, a coating is produced that is physically interlocked within the interconnecting porosity of the substrate. Impregnating substrates with carbon precursors followed by curing, carbonizing, and activating is described in EPO patent application publication no. 608, 539. That publication is herein incorporated by reference.

Carbon precursors useful in this embodiment of the present invention include any liquid or liquefiable carbonaceous substance. Examples of useful carbon precursors include thermosetting resins, thermoplastic resins (e.g., polyvinylidene chloride, polyvinyl chloride, polyvinyl alcohol, and the like), sugar solutions, furfuryl alcohol, and coal tar pitch.

Low viscosity carbon precursors (e.g., thermosetting resins) are preferred because their low viscosity allows greater penetration of the carbon precursor into porous inorganic substrates. Typical resin viscosity ranges from about 50 to 1000 cps. Phenolic resins are most preferred due to their low viscosity, high carbon yield, high degree of cross-linking upon curing relative to other precursors, and low cost. The carbon precursor liquid used in the present method can include a single precursor material or a mixture of two or more precursor materials. Optionally, activated carbon can be added to the carbon precursor liquid to increase the adsorptive capability of the activated carbon structure.

Any high carbon yield resin can be used. By high carbon yield is meant that greater than about 10% of the starting weight of the resin is converted to carbon on carbonization. Phenolic and furan resins are the most suitable. One especially suitable furan liquid resin is Furcarb-LP from QO Chemicals Inc. Another suitable resin is phenolic resole resin such as 43250 plyophen resin from Occidental Chemical Corp.

The contacting is done by any method suitable to bring the carbon precursor in intimate contact with the inorganic substrate. Exemplary methods of contacting include dipping the substrate in the precursor solution (or liquid) or spraying the precursor solution (or liquid) directly on the substrate.

The carbon precursor liquid penetrates into the interconnecting porosity of the substrate. For example, for honeycombs, the coating is present on the outer surfaces as well as on the webs or walls.

The eventual quantity of carbon formed on the substrate is dependent on the amount of carbon precursor retained by the substrate. The amount of carbon precursor retained by the substrate can be increased eg., by contacting the substrate with the precursor more than once and allowing the substrate to dry between contacting steps. In addition, the amount of precursor retained by the substrate can be controlled in porous substrates by simply modifying the overall porosity of the substrate (e.g., increasing porosity will increase the amount of precursor retained by the substrate and in turn the amount of carbon formed thereon).

The substrate and carbon precursor are then subjected to heat-treatments to cure the precursor and thereafter convert the precursor to continuous carbon (carbonize). The resulting carbon-coated substrate is then heat-treated to activate the carbon and produce an activated carbon structure.

The curing is accomplished typically by heating the coated substrate to temperatures of about 100° C. to about 200° C. for about 0.5 to about 5.0 hours. Curing is generally performed in air at atmospheric pressures. When using certain precursors, (e.g., furfuryl alcohol) curing can be accomplished by adding an acid catalyst at room temperature.

The curing catalysts can be any of those known in the art. Some typical curing catalysts are ammonium chloride, ammonium nitrate, zinc chloride, citric acid, and paratoluene sulphonic acid (PTSA) or combinations of these. The preferred catalysts are zinc chloride and PTSA because they have been found to result in the highest amount of activated carbon in the structure when all other factors are constant.

Carbonization is the thermal decomposition of the carbonaceous material, thereby eliminating low molecular weight species (e.g., carbon dioxide, water, etc.) and producing a fixed carbon mass and a rudimentary pore structure in the carbon.

Such conversion or carbonization of the cured carbon precursor is accomplished typically by heating the substrate to a temperature in the range of about 600° C. to about 1000° C. for about 1 to about 10 hours in a reducing or inert atmosphere (e.g., nitrogen, argon, etc.).

Curing and carbonizing the carbon precursor on the substrate results in a structure having a coating extending over the entire surface of the substrate in the form of a substantially uninterrupted layer of carbon. This carbon coating is anchored into the porosity of the substrate and as a result is highly adherent. The top surface of the carbon coating is an uninterrupted layer of carbon to carbon bonds.

As discussed above, if interconnecting porosity is present in the substrate, an interlocking network of carbon will be formed within the composition, resulting in an even more adherent carbon coating. The coating of uninterrupted carbon extending over the outer surface of the substrate formed provides a structure with advantages of high adsorptive capability despite a relatively low carbon content, high strength, and high use temperatures. Structures can be formed which contain carbon in an amount less than and up to about 50%, and often less than and up to about 30% of the total weight of the substrate and carbon.

The activating is done to substantially enhance the volume and to enlarge the diameter of the micropores formed during carbonization, as well as to create new porosity. Activation creates a high surface area and in turn imparts high adsorptive capability to the structure. Activation is done by known methods such as exposing the structure to an oxidizing agent such as steam, carbon dioxide, metal chloride (e.g., zinc chloride), phosphoric acid, or potassium sulfide, at high temperatures (e.g., about 600° C. to about 1000° C.).

The temperature and time for activation can be controlled to obtain the desired pore size in the activated carbon. Lower temperatures and times result in smaller pore sizes; while higher temperatures and times result in the larger pore sizes. Those skilled in the art can determine the proper temperature and time conditions depending on the relative pore sizes that are desired in the activated carbon.

The activated carbon coating of the above-described activated carbon structure is highly resistant to chipping and flaking, exhibits high strength and is highly resistant to high temperatures in comparison with carbon coatings produced by dipping a substrate in a slurry of activated carbon and binder. In addition, these carbon-coated structures exhibit adsorptive capabilities higher than extruded carbon structures or coated substrates where the coating is made directly from carbon.

Because of these properties, the continuous coated substrate adsorbers, and most advantageously the non-electrically conducting substrate adsorbers, are excellent candidates for receiving electrically conducting means and conducting a uniform current therethrough.

In another embodiment, the activated carbon coating can be applied by the conventional technique of contacting a slurry of activated carbon particles and binder such as thermoplastic or thermosetting resin binder with the substrate. These binders can be carbonized to obtain a continuous carbon coating. Binders have to be in such proportion that conductivity of the carbon is not affected. Too much binder can coat particles of carbon and if binder system has high resistance to electricity, it can cause hot spot problems in electrical heating applications. Typically the binder should be less than about 15 wt. % of the carbon weight and preferably less than about 10%.

The activated carbon adsorber in the form of either an activated carbon coated non-electrically conducting substrate, or a shaped activated carbon body, with or without a catalyst, can be fitted with electrically conducting means. U.S. patent application Ser. No. 08/249,897 filed May 26, 1994 describes some preferred methods and materials for doing this with non-conducting filters. That application is herein incorporated by reference as filed. In this embodiment, advantage is taken of the conductive properties of carbon. With the passage of an electric current through the carbon, the carbon heats up to a predetermined temperature depending on the resistance of the body and the voltage applied. The body can be designed with resistance and voltage suitable for raising the temperature of the structure significantly above the desorption temperature of the adsorbed species. Therefore, depending on the species adsorbed, the temperature can be controlled in such a way as to cause desorption of the adsorbed species.

The electrically conducting means are positioned so as to be able to conduct an electric current through the adsorber or more particularly, the carbon, to heat carbon uniformly. The actual positioning of the conducting means depends on the type of means and on the geometry of the device and the invention is not limited to any specific type of conducting means or geometry as long as the current generates uniform heating of the device without hot spots.

In general, the conducting means must provide a resistivity of at least about 0.001 ohm.cm, but typically at least about 0.01 ohms, and most typically at least about 0.10 ohm.cm. For most purposes of the present application, the resistivity is between about 0.10 ohm.cm and 25 ohm.cm.

For the purposes of the present invention resistivity of the body is defined by the formula:

$$\rho = \frac{R \cdot A}{L}$$

where $\rho$ is the resistivity in ohm.cm, R is the resistance in ohms, A is the area of a conducting surface in $cm^2$, and L is the distance between two conducting surfaces in cm.

The voltage and current requirement will vary depending on the application and the resistivity can be adjusted as desired according to the above equation. For example, if the adsorber is to be heated in an oxygen containing atmosphere, such as air for automotive applications, the voltage and current should be such as to raise the temperature so that no hot spot in the body higher than about 350° C. If the adsorber is to be heated in an inert or non-reacting atmosphere, e.g., $N_2$, the voltage and current should be such as to raise the temperature so that no spot in the body is higher than about 1000° C.

Some especially preferred conducting materials are metals as copper, silver, aluminum, zinc, nickel, lead, tin and their alloys, with the preferred being copper because of its high conductivity which minimizes resistance, and because it is inexpensive.

The conducting means is typically either in the form of a strip of the conducting material or electrode or a coating of conductive material on the monolith filter. In this invention, the term "conductive coating" refers to the coating which is applied to the total device and is thereby differentiated from the carbon coating of the carbon coated filters.

If an electrode is used, it can be applied by pressure contact e.g., a spring. Or a strip of conducting metal can be used and be attached to the filter by an electrically conducting adhesive such as e.g., silver-containing epoxies such as E-solder #3012 and #3021 from Acme Chemicals and Insulation Co.

A conductive coating is cost effective and gives a uniform resistance path so as to avoid hot spots.

One especially suitable geometry is having the conducting metal applied to opposing surfaces of the filter. By opposing surfaces is meant surfaces that are so spaced according to the geometry of the body that passage of current between the conductive surfaces produces a current that heats the carbon uniformly.

Metal substrates can be fitted with electrodes as is commonly known in the art for electrically heated catalytic devices (EHC's).

The preferred activated carbon shaped adsorbers are honeycombs, preferably honeycombs extruded from raw material mixtures of activated carbon or activated carbon precursors such as thermosetting resins of the types described previously.

In accordance with one embodiment, the activated carbon shaped adsorber is first formed from a carbon precursor such as a thermosetting resin as phenolic resin. This can be done by forming a mixture of the resin and binders, forming, e.g extruding into the shaped body, followed by carbonizing and activating according to well-known procedures.

For example the activated carbon shaped adsorber can be made by forming e.g. extrusion mixtures of activated carbon particles with suitable binders such as various clays such as disclosed in U.S. Pat. No. 4,518,704, or extruding a kneaded mass containing a thermosetting resin, a water-soluble thermosetting resinous additive as a binder and an extrusion aid, followed by drying and heat-treating, as disclosed in U.S. Pat. No. 4,399,052 both U.S. patents of which are herein incorporated by reference.

Also, the activated carbon shaped adsorber can be made by extruding a mixture of thermosetting resin which is either solid such as phenolic novolak or liquid such as phenolic resole, having a high viscosity e.g. 100–1000 cps, hydrophilic filler, temporary organic binder, e.g. methylcellulose and/or its derivatives, and optionally extrusion aids e.g. sodium stearate, drying the shaped form and curing the resin, and carbonzing and activating the carbon to form the adsorber. These embodiments are disclosed in U.S. application Ser. No. 08/395,224, filed Feb. 27, 1995 and is herein incorporated by reference.

In these embodiments, for both liquid and solid resin systems, the filler must be hydrophilic in order to be easily wet by the liquids in the system. The fillers are most typically an oxygen-containing, e.g. oxide substance, and are therefore relatively inexpensive.

The fillers can be fibrous. Fibrous fillers typically give higher strength and stiffness to a structure compared a particulate structure. According to this invention, by fibrous is meant a length of up to about 1 centimeter, and preferably up to about 500 micrometers. The diameter is up to about 500 micrometers, preferably up to about 100 micrometers, and most preferably up to about 10 micrometers.

Depending on whether the resin is liquid or solid, the types of fillers that must be used will vary.

Using either liquid or solid resin alone presented certain problems that had to be solved.

For example, liquid resin has a very low viscosity and requires some type of filler to be extrudable. Elemental carbon fillers may be used to form an extrudable batch but on carbonization such structures have poor strength since the carbon filler does not bond to the resin.

For liquid resin systems, it was found that addition of a hydrophilic carbonizable (essentially organic) filler, with or without a hydrophobic organic filler, (preferably fibrous), is necessary to form a good honeycomb extrusion. Hydrophilic organic fibrous filler allows the liquid resin to infiltrate the fibrous structure at high loading levels. The mixture has good rigidity and is extruded into a honeycomb shape easily and maintains the shape on carbonization. Inorganic hydrophilic fillers preferably with a fibrous morphology can also be used with liquid resins in addition to the carbonizable filler. Mixtures of organic and inorganic fillers result in optimized strength and rigidity of the final carbon product, as well as minimization of cost. Inorganic fillers also minimize shrinkage and warpage.

Both natural and synthetic carbonizable fillers can be used. Some natural materials are soft woods, e.g. pine, spruce, redwood, etc., hardwoods e.g. ash, beech, birch, maple, oak, etc., sawdust, shell fibers e.g. ground almond shell, coconut shell, apricot pit shell, peanut shell, pecan shell, walnut shell, etc., cotton fibers e.g. cotton flock, cotton fabric, cellulose fibers, cotton seed fiber, chopped vegetable fibers for example, hemp, coconut fiber, jute, sisal, and other materials such as corn cobs, citrus pulp (dried), soybean meal, peat moss, wheat straw, wool fibers, corn, potato, rice, and tapioca etc. Some synthetic materials are regenerated cellulose, rayon fabric, cellophane, etc.

Some examples of carbonizable fillers that are especially suited for liquid resins are cellulose, cotton, wood, and sisal, or combinations of these, all of which are preferably in the form of fibers.

One especially suited carbonizable fiber filler is cellulose fiber as supplied by International Filler Corporation, North Tonowanda, N.Y. This material has the following sieve analysis: 1–2% on 40 mesh (420 micrometers), 90–95% thru 100 mesh (149 micrometers), and 55–60% thru 200 mesh (74 micrometer).

Some inorganic fillers that can be used are oxygen containing minerals such as clays, zeolites, talc, etc., carbonates, such as calcium carbonate, aluminosilicates such as kaolin (an aluminosilicate clay), flyash (an aluminosilicate ash obtained after coal firing in power plants), silicates, e.g. wollastonite (calcium metasilicate), titanates, zirconates, zirconia, zirconia spinel, magnesium aluminum silicates, mullite, alumina, alumina trihydrate, spinel, feldspar, attapulgites, and aluminosilicate fibers, cordierite powder, etc.

Some examples of especially suited inorganic fillers are cordierite powder, talcs, clays, and aluminosilicate fibers such as provided by Carborundum Co. Niagara Falls, N.Y. under the name of Fiberfax, and combinations of these. Fiberfax aluminosilicate fibers measure about 2–6 micrometers in diameter and about 20–50 micrometers in length.

Hydrophobic organic fillers provide additional support to the shaped structure and introduce wall porosity on carbonization because in general they leave very little carbon residue. Some hydrophobic organic fillers are polyacrylonitrile fibers, polyester fibers (flock), nylon fibers, polypropylene fibers (flock) or powder, acrylic fibers or powder, aramid fibers, polyvinyl alcohol, etc.

In general the particle or fiber size of the fillers must be such that they will be able to pass through the respective die in forming thin walled structures such as honeycombs. For example, for extrusion of a 0.15 mm (6 mil) wall honeycomb through a die that has 152 micrometer openings, up to about 420 micrometer long cellulose fibers have been found to work well. This example is merely illustrative and it is to be understood that the invention is not limited to specific size fillers for specific size structures.

For both solid and liquid resins, the filler makes up about 10% to 85 wt. % of the mixture (excluding any water that is added). The weight ratio of filler to resin is generally about 0.2 to 4.0.

One liquid resin mixture that is suitable for the present invention consists essentially of in percent by weight about 2% to 50% cellulose fibers, about 4% to 10% organic binder which is typically methylcellulose, and/or methylcellulose derivatives, 0% to about 15% hydrophobic organic filler such as polyester flock, polypropylene flock or powder, acrylic fibers or powders, etc, 0% to about 2% lubricant, e.g. soap, and the balance being phenolic resole.

More advantageously, the liquid resin mixture consists essentially of in percent by weight about 20% to 35% cellulose fibers, about 4% to 10% and more typically about 3% to 7% organic binder which can be methylcellulose, and/or its derivatives, 0% to about 2.0% lubricant, e.g., soap, and the balance being phenolic resole.

The above compositions can include additionally about 5% to 60% and more advantageously about 10% to 30% cordierite powder filler.

Another useful liquid resin mixture consists essentially of in percent by weight about 2% to 50% cellulose fibers, about 30% to 45% inorganic filler which can be any one or combination of cordierite powder, clay, and talc, about 4% to 10% organic binder which can be methylcellulose, and/or its derivatives, 0% to about 2% lubricant, e.g. soap, and the balance being phenolic resole.

More advantageously the composition consists essentially of in percent by weight about 9% to 25%, and most typically about 10% to 15% cellulose fibers, about 30% to 45% inorganic filler which can be clay, e.g. hydrite clay, talc, or cordierite powder, or combinations of these, about 4% to 10% organic binder which can be methylcellulose, and/or its derivatives, about 0% to 2.0%, e.g. soap, and the balance being phenolic resole.

Such compositions are advantageous for liquid resin systems because the carbonizable hydrophilic materials such as cellulose fibers soak in the liquid resin and form a stiff batch which can be extruded. Additionally on carbonization, they yield carbon which results in additional adsorption capacity. The inorganic filler reduces shrinkage on carbonization and imparts strength and stiffness and reduces batch cost.

Solid phenolic resin (novolak) is solid at room temperature, but melts at about 60°–75° C. The cure temperature is, however about 150° C. As the extruded product is heated to cure the resin at about 150° C., the structure collapses at about 75° C.

For solid systems, the filler stiffens the structure during the softening of the resin before cure. The filler can be either a carbonizable or an inorganic material. A combination of inorganic and carbonizable material is preferred. Hydrophobic organic fillers are also desirable in solid resin mixtures. The advantages of carbonizable and hydrophobic organic fillers have been previously discussed.

The preferred solid resin is novolak.

The carbonizable and inorganic fillers are the same as described above for liquid resins. For solid resins, fibrous inorganic fillers are especially useful.

One useful solid resin mixture composition consists essentially of in percent by weight about 2% to 50% cellulose fiber, about 5% to 50% inorganic filler which can be cordierite powder, talc, or combinations of these, about 5% to 10% organic binder which can be methylcellulose, and/or its derivatives, 0% to about 15% hydrophobic organic filler such as polyester flock, polypropylene flock or powder, acrylic fibers or powders, etc, 0% to about 2% lubricant, e.g. soap, and the balance being novolak.

More advantageously, the solid resin mixture composition consists essentially of in percent by weight about 8% to 22%, and more typically about 8% to 12% cellulose fiber, about 15% to 30% inorganic filler which can be cordierite powder and/or talc, about 5% to 10% organic binder which can be methylcellulose and/or its derivatives, 0% to 3%, and more typically about 0.5% to about 2% lubricant, e.g. soap, and the balance being novolak.

Another useful solid resin mixture composition consists essentially of in percent by weight about 5% to 50% aluminosilicate fiber, about 5% to 50% carbonizable filler, about 4% to 10% organic binder which can be methylcellulose, and/or its derivatives, about 1% to about 3% lubricant, and the balance being novolak.

More advantageously the mixture composition consists essentially of in percent by weight about 8% to 15% aluminosilicate fiber, about 5% to 20% hydrophobic organic filler, e.g. polyester flock, about 4% to 10% organic binder which can be methylcellulose and/or its derivatives, about 1% to about 3% lubricant, e.g. soap, and the balance being novolak.

The mixture components are blended. Most typically dry components are blended after which they are blended with the liquid components in a muller. Water is added if necessary to make the mixture handleable for extrusion. The mixture is then extruded. Conventional extrusion equipment can be used. For example, the extrusion can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die.

The shaped bodies are then dried. Drying can be done in air at room temperature—80° C. or in dielectric or microwave dryers.

The dried bodies are then cured in the shaped form by heating under the specific temperature and time conditions required for the specific resin. The curing can be done in a conventional oven. Standard curing conditions can be found in the manufacturer's literature. For example, for phenolic resole 43290 from Occidental Chemical Co. the body is heated in air to about 140°–155° C. The final temperature is attained slowly so that the body does not distort. For example, the body is first heated to about 90° C.–100° C. then to about 120° C.–130° C. and held at this temperature for about 1–2 hours. It is then heated to about 140° C.–155° C. and held for about 30 minutes–2 hours for final cure. Curing can also be done in a dielectric or microwave oven.

The carbonization is carried out by heating the body in an inert or reducing atmosphere such as nitrogen or argon or forming gas. Forming gas is a mixture of nitrogen and hydrogen. Typical mixtures by volume are 92:8 or 94:6 $N_2$:$H_2$, although any mixtures can be used. Carbonization temperatures are about 600° C.–1000° C. or more typically about 700°–1000° C. for a length of time of usually about 1–20 hours. While the body is in the temperature range of about 300°–600° C. the fugitive materials vaporize. During carbonization low molecular weight compounds separate out and carbon atoms form graphitic structures. For example for phenolic resole resin 43290 from Occidental Chemical Co. and Furan Furcarb resin from QO Chemicals, carbonization is done by heating at a rate of about 150° C./hr in $N_2$. The temperature is held at about 900° C. for about 6–10 hours to complete the carbonization. The temperature is then reduced to 25° C. at a cooling rate of about 150° C./hr. On carbonization, the body contains random three dimensional oriented graphitic platelets with amorphous carbon between the platelets.

The activation is done by partially oxidizing in a suitable oxidant such as $CO_2$, steam, air, or a combination of these, etc. Activation can be carried out at temperatures between about 700° C.–1000° C. Activation conditions depend on type and amount of resin, flow rate of gas, etc. For example for phenolic resole and Furcab resins activation conditions are at about 900° C. for about 1 hour in $CO_2$ at a flow rate of about 14.2 l/hr. (about 0.5 CFH ($ft.^3$/hr.)). The partial oxidation during activation causes the removal of the amorphous carbon and the formation of molecular size porosity between the graphitic platelets. This porosity and the graphitic platelets impart the adsorption characteristics to the resulting activated carbon body. As with activated carbon coated monoliths, the activation conditions can be determined according to the pore size that is desired in the adsorber.

To more fully illustrate the invention, the following non-limiting examples are presented. All parts, portions, and percentages are on a weight basis unless otherwise stated.

The following experiments were done to evaluate activated carbon coated ceramic honeycombs as adsorbents for multiple contaminants.

Two sets of honeycombs with about 62 cells/$cm^2$ (400 cells/$in^2$) were made. Each set consisted of two 2.54 cm (1") diameter and 3.8 cm (1½") long core drilled honeycombs. The two honeycombs in a given set were processed identically to obtain the same pore size activated carbon structure on each honeycomb. The two honeycombs in the set then had identical adsorption characteristics. One set was treated to give a small pore size carbon and another set was treated to obtain a large pore size carbon. Adsorption experiments were conducted with two different adsorbates—butane and formaldehyde. The dynamic adsorption experiments were done with a combination of these honeycombs and described below.

EXPERIMENT 1

The large pore size honeycomb set of two honeycombs was installed in an adsorption apparatus thus creating a column of about 2.54 cm (1") diameter and about 7.62 cm (3") long. Butane-containing nitrogen at about 80 ppm butane was passed through the column at a flow rate of about 30,000 cc/min. The flow was continued until the column was saturated. The total butane adsorption capacity of the column was about 148 mg. The butane was then desorbed by flowing nitrogen at about 30,000 cc/min at 25° C. It was found that about 97 mg of butane could be easily desorbed in this manner without heating the honeycomb.

The identical small pore honeycomb system with about 2.54 cm (1") diameter and about 7.62 cm (3") long when subjected to the same test under identical conditions adsorbed about 230 mg but desorbed only about 55 mg of butane.

The working butane adsorption capacity of the large pore system is thus about 97 mg and the small pore system is about 55 mg. The larger pore system is thus more desirable for continuous operation.

EXAMPLE 2

The large pore and small pore honeycombs were subjected to a test similar to that in Example 1, except that about 30 ppm formaldehyde was used as an adsorbate with about 30,000 cc/min flow rate. The large pore system adsorbed only about 18 mg of formaldehyde, but the small pore system adsorbed about 34 mg of formaldehyde, about double that of the large pore system. Both systems could be easily desorbed fully by flowing nitrogen as described in Example 1. The working capacity for formaldehyde for the large pore system is thus about 18 mg and that of the small pore system is about 34 mg, about 89% larger than the large honeycomb system.

EXAMPLE 3

Both the large and small pore honeycomb systems were then subjected to testing with about 80 ppm butane and about 30 ppm formaldehyde mixed streams at about 30,000 cc/min. The adsorption capacity for large pore system was about 169 mg for the mixed stream. Desorption was about 84 mg. For the small pore system, the adsorption capacity was about 256 mg with only about 72 mg desorbed in the desorption cycle. The working capacity for the large pore system is thus about 84 mg, and for the small pore system about 72 mg.

EXAMPLE 4

A combination system in which are a large pore carbon honeycomb, and a small pore carbon honeycomb was placed in series. The adsorption experiment was carried out by subjecting the mixed honeycomb system to a mixed stream at about 80 ppm butane and about 30 ppm formaldehyde. The adsorption column is thus again about 7.62 cm (3") long. The large pore honeycomb was first in the flow stream followed by the small pore honeycomb. The adsorption capacity for the mixed stream of this system was about 210 mg. On desorption about 101 mg of hydrocarbon was removed. The working capacity of this system is thus greater than about 100 mg and is significantly greater than the large pore or the small pore honeycomb system alone.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method for removing more than one contaminant from a workstream, the method comprising:

a) passing a workstream containing more than one contaminant having different molecular sizes through a first open ended monolith adsorber comprising activated carbon having a mean platelet distance of about 10 to 30 angstroms, for adsorbing the major portion of the larger molecular size contaminant and for allowing the smaller molecular size contaminant to pass through the monolith, to cause adsorption of the major portion of the larger molecular size contaminant by the activated carbon and produce an effluent stream containing the major portion of the smaller molecular size contaminant; and thereafter b) passing the effluent stream from the first adsorber through a second open ended monolith adsorber comprising activated carbon having a mean platelet distance of about 5 to 15 angstroms, for adsorbing the smaller molecular size contaminant, to cause adsorption of the major portion of the smaller molecular size contaminant by said second monolith activated carbon.

2. A method of claim 1 wherein each monolith is a honeycomb.

3. A method of claim 1 wherein the workstream contains large molecular size contaminants selected from the group consisting of butane, toluene, xylene, isopropanol, pentane, hexane, and combinations thereof, and small molecular size contaminant selected from the group consisting of methane, formaldehyde, carbon dioxide, hydrogen, ethylene, and combinations thereof.

4. A method of claim 1 comprising the additional step after step b of passing a regenerating stream first through the second monolith and thereafter through the first monolith, said first and second monoliths having contaminants adsorbed thereon, to remove the adsorbed contaminants from the monoliths whereby the monoliths are regenerated for re-use.

5. A system for adsorbing a plurality of contaminants from a workstream, the system comprising:

a) a first stage open-ended monolith adsorber; and b) a second stage open ended monolith adsorber downstream of the first stage, wherein each monolith comprises activated carbon adsorber, the first stage activated carbon having a mean platelet distance of about 10 to 30 angstroms, and the second stage activated carbon adsorber having a mean platelet distance of about 5 to 15 angstroms.

6. A system of claim 5 wherein the monoliths are honeycombs.

* * * * *